(12) United States Patent  (10) Patent No.: US 8,344,572 B2
Moellgaard et al.  (45) Date of Patent: Jan. 1, 2013

| | | | |
|---|---|---|---|
| (54) | ELECTROMOTIVE PART OF AN ELEVATOR DRIVE | | |
| (75) | Inventors: | Nis-Anton Moellgaard, Schorndorf (DE); Uwe Resag, Aichtal (DE); Jochen Schulze, Reutlingen (DE); Eberhard Vogler, Neuhausen (DE); Roland Naegele, Stuttgart (DE) | |
| (73) | Assignee: | Thyssenkrupp Elevator AG, Duesseldorf (DE) | |
| ( * ) | Notice: | Subject to any disclaimer, the term of this patent is extended or adjusted under 35 U.S.C. 154(b) by 254 days. | |
| (21) | Appl. No.: | 12/601,521 | |
| (22) | PCT Filed: | May 22, 2007 | |
| (86) | PCT No.: | PCT/EP2007/004521 | |
| | § 371 (c)(1), (2), (4) Date: | Apr. 8, 2010 | |
| (87) | PCT Pub. No.: | WO2008/141662 | |
| | PCT Pub. Date: | Nov. 27, 2008 | |
| (65) | | Prior Publication Data | |
| | US 2010/0201219 A1 | Aug. 12, 2010 | |
| (51) | Int. Cl. | | |
| | *H02K 1/00* | (2006.01) | |
| | *H02K 3/00* | (2006.01) | |
| (52) | U.S. Cl. ................ 310/179; 310/208; 310/180 | | |
| (58) | Field of Classification Search .......... 310/208, 310/179, 180, 184, 201 See application file for complete search history. | | |
| (56) | | References Cited | |

U.S. PATENT DOCUMENTS

| | | | |
|---|---|---|---|
| 2,845,694 A | 8/1958 | Le Tourneau | |
| 3,396,321 A * | 8/1968 | Pellecchia | 318/595 |
| 5,759,589 A | 6/1998 | George, Jr. | |
| 6,326,715 B1 * | 12/2001 | Asao et al. | 310/180 |
| 6,396,185 B1 * | 5/2002 | Asao et al. | 310/180 |
| 6,894,417 B2 * | 5/2005 | Cai et al. | 310/198 |
| 6,901,649 B2 * | 6/2005 | Imori et al. | 29/596 |
| 7,327,063 B2 * | 2/2008 | Matsubara | 310/184 |
| 7,598,648 B2 * | 10/2009 | Fei | 310/184 |
| 8,134,269 B2 * | 3/2012 | Miyata et al. | 310/180 |
| 2004/0021437 A1 | 2/2004 | Maslov et al. | |
| 2005/0206263 A1 * | 9/2005 | Cai et al. | 310/198 |

(Continued)

FOREIGN PATENT DOCUMENTS

DE  199 61 760 A1  7/2001

(Continued)

OTHER PUBLICATIONS

Translation of foreign document JP 2006089225 A.*

(Continued)

*Primary Examiner* — Quyen Leung
*Assistant Examiner* — Alex W Mok
(74) *Attorney, Agent, or Firm* — Lathrop & Gage LLP

(57) ABSTRACT

The present invention relates to an electromotive part of an elevator drive, comprising a rotor (24) and a stator (10, 22), wherein windings of the stator and/or the rotor (24) are provided as single tooth windings. An electromotive part of an elevator drive, is provided as an internal rotor motor, and includes a rotor and a stator. Windings of the stator and/or the rotor are provided as single tooth windings, the windings are, at least in part, encapsulated, and the windings are provided as two-layer windings. A method for winding-up windings of an electromotive part of an elevator drive with two-layer windings, includes inserting the windings of individual phases as alternating upper and lower layers.

4 Claims, 2 Drawing Sheets

U.S. PATENT DOCUMENTS

| | | | |
|---|---|---|---|
| 2005/0258703 A1* | 11/2005 | Kouda et al. | 310/180 |
| 2006/0138883 A1* | 6/2006 | Yagai et al. | 310/71 |

FOREIGN PATENT DOCUMENTS

| | | | |
|---|---|---|---|
| EP | 1677404 A2 | | 12/2005 |
| EP | 1 677 404 A2 | | 7/2006 |
| JP | 06209535 A | * | 7/1994 |
| JP | 10304641 A | | 11/1998 |
| JP | 11266574 A | | 9/1999 |
| JP | 2000201462 | | 7/2000 |
| JP | 2000201462 A | * | 7/2000 |
| JP | 2001-258191 | | 9/2001 |
| JP | 2006089225 | | 4/2006 |
| JP | 2006089225 A | | 4/2006 |
| JP | 2006187175 | | 7/2006 |
| JP | 2007267570 A | | 10/2007 |
| JP | 2009171720 A | | 7/2009 |
| WO | WO 96/31936 | | 10/1996 |
| WO | WO 02/103883 | | 12/2002 |
| WO | WO 2005/041390 | | 5/2005 |
| WO | WO 2007/036284 A1 | | 4/2007 |

OTHER PUBLICATIONS

Translation of foreign document DE 19961760 A1.*
Translation of foreign document JP 2000201462 A.*
Translation of foreign document JP 2006089225 A (Apr. 6, 2006).*
Translation of foreign document DE 19961760 A1 (Jul. 5, 2001).*
Translation of foreign document JP 2000201462 A (Jul. 18, 2000).*
European Application No. EP 08 10 4080 Search Report, Nov. 4, 2009, 3 pages.
PCT/EP2007/004521, International Search Report & Written Opinion, Jul. 3, 2008, 34 pages.
PCT/EP2007/004521, International Preliminary Report on Patentability, Dec. 19, 2009, 28 pages.
Office Action dated Apr. 22, 2011 issued in related Korean Application 10-2009-7025859, 4 pages.
Korean Patent Application No. 10-2009-7025859, Brief Translation of Office Action dated Dec. 20, 2011, 3 pages.
Office Action issued in related Japanese Patent Application 2010-508706, issued Mar. 6, 2012, 10 pages.

* cited by examiner

ELECTROMOTIVE PART OF AN ELEVATOR DRIVE

CROSS-REFERENCE TO RELATED APPLICATIONS

This application claims priority to PCT application No. PCT/EP2007/004521, filed on 22 May 2007 and entitled ELECTROMOTIVE PART OF AN ELEVATOR DRIVE, which is incorporated herein by reference in its entirety.

BACKGROUND

The invention relates to an electromotive part or section of an elevator drive. The invention also relates to a method for winding up or inserting windings of an electromotive part of an elevator drive.

In connection with elevator drives, typically electric motors are used, which constitute the electromotive part of the elevator drive. This electromotive part, which for example is provided as a synchronous motor with a rotor and a stator, is usually connected to an external power supply, wherein the current generates magnetic fields in windings of the rotor and/or the stator, which repel or attract each other, and thus make the rotor rotate. Furthermore, it is known to use permanent magnets for the rotor.

In electromotive parts of elevator drives it is, due to the limited space available, especially important to use motors with small space requirements, and which are thus of small size.

From document WO 99/43590 there is known an elevator system with a permanently excited motor. The elevator is operated with a hoist rope cooperating with the motor. The rope comprises at least a load carrying element, which is included in a casing made of a non-metallic material. The motor drives the hoist rope, which, in turn, moves an elevator car within the elevator shaft. The motor comprises a rotor, which is partly formed with permanent magnets. It is considered disadvantageous in connection with this motor that it has relatively high space requirements.

From document WO 99/43589 there is known an elevator system with a drive motor, which is arranged between the elevator car and the elevator shaft side wall. Herein, a counterweight is additionally provided, which is also arranged within the elevator shaft. The drive motor is connected to the elevator car via at least one flat rope. This motor also requires a lot of space.

The document WO 02/103883 A1 describes an electric motor, which is especially provided for an elevator drive. This motor comprises a stator and a rotor, the stator and/or the rotor comprising at least a plastics part serving as housing or body respectively, in which electromagnetic and/or permanently magnetic functional elements of the stator and/or rotor are, at least in part, embedded.

SUMMARY

An electromotive part of an elevator drive, is provided as an internal rotor motor, and includes a rotor and a stator. Windings of the stator and/or the rotor are provided as single tooth windings, the windings are, at least in part, encapsulated, and the windings are provided as two-layer windings.

A method for winding-up windings of an electromotive part of an elevator drive with two-layer windings, includes inserting the windings of individual phases (U, V, W) as alternating upper and lower layers.

BRIEF DESCRIPTION OF THE DRAWINGS

The invention is schematically shown by means of embodiment examples in the figures, and is described in detail in the following with reference to the figures.

DETAILED DESCRIPTION OF THE DRAWINGS

Figure 1:
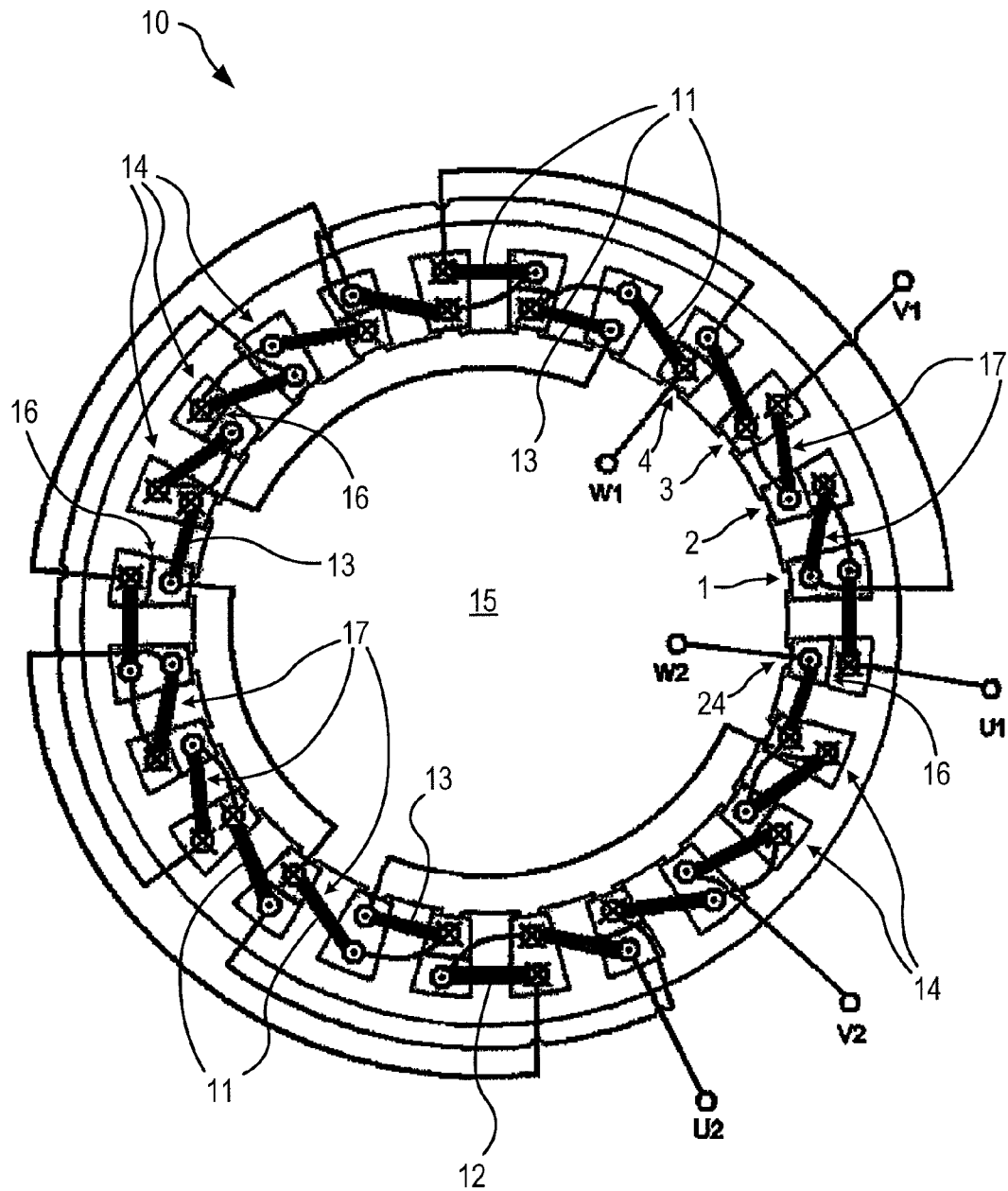
FIG. 1 shows a stator, in which an electromotive part of an elevator drive according to the invention is used.

Further advantages and embodiments of the invention will follow from the description and the appended figures. It is to be understood that the features mentioned above and the features discussed in the following are utilizable not only in the specifically disclosed combination, but also in other combinations or taken by themselves, without departing from the scope of the present invention.

The electromotive part of an elevator drive according to the invention comprises a rotor and a stator, wherein windings of the stator and/or of the rotor are provided as single tooth windings, or, in other words, concentrated windings. This single tooth winding, in which the individual windings are each only wound around one tooth or cog, make possible the manufacture of motors with smaller space requirement and higher efficiency by means of usage of small end windings.

The coils are, in an embodiment, at least partly, especially fully, encapsulated, wherein typically a plastics compound is used for encapsulating. The encapsulating of the coils has the advantage that the encapsulation can take over supporting or load-bearing functions. By fixation of the windings, the manufacture of such a motor is substantially simplified over prior art motors, as, for example, no mechanical pre- and/or post-treatment of components is necessary.

The encapsulation as provided also leads to substantial thermal advantages due to the achieved better heat conduction and the achieved homogenous heat distribution.

By means of the combination of single tooth winding and encapsulating the winding a marked enhancement of power density due to the high efficiency of the single tooth winding and the enhanced heat dissipation is provided. As a compound for the encapsulation, for example an epoxy material with various filler materials and filler components can be used.

The single tooth winding, which is also known as concentrated winding, can be provided as a one layer or a two layer winding. The two layer winding, in which there are two windings provided in each groove, is advantageous with respect to the achieved detent torque. Also, the efficiency is enhanced.

The electromotive part of an elevator drive according to the invention can be provided with or without a housing. In the embodiment without housing or housing-less embodiment, the stator package lies open. The housing-less embodiment offers an even better heat dissipation at the surface and an additional saving of costs.

Also, it is possible to provide the electromotive part according to the invention as internal rotor motor or external rotor motor.

As regards cooling, one differentiates between auto ventilated, self ventilated and force ventilated cooling systems, in which a ventilator is driven by a separate motor.

The invention is especially suitable for permanently excited synchronous motors, in which for example the electromagnetic functional elements of the rotor are provided as permanent magnets. Also, the motor can be provided as "normal" motor with a cylindrical air gap or as disc rotor with disc shaped air gap.

In an embodiment a two layer winding is provided with alternating upper and lower layers. Preferably, the phases are wound up or inserted subsequently to one another.

When inserting the windings, care must be taken that windings of different phases can only be inserted into one groove with an intermediate insulation material, as the insulation of the windings as such is not sufficient herefore. For this reason, typically an insulation paper is used.

The specific arrangement of the windings in case of a two layer winding, in which the windings of individual phases are inserted with alternating upper and lower layers, simplifies an automatic or automated method and an automatic winding up of windings. An insertion of windings without having to connect these windings, with the exception of the neutral point or star point, is also possible.

The method according to the invention serves to insert the windings, wherein windings of each phase can be inserted subsequently to one another. This is especially possible, if windings of individual phases are inserted as alternating upper and lower layers.

The provision of a single tooth winding as a two-layer-winding achieves, by reducing losses and reducing torque ripple, an enhancement of power density. The specific arrangement of windings makes possible the automatic insertion of windings without the time intensive connection work, as only the neutral point must be connected.

Furthermore, connection rings, which allow a pairing with other functional groups (modular design principle) are provided, which allow a simple encapsulation, as no sealing and only one die for various overall lengths is necessary for encapsulation.

In an embodiment, a modular construction is provided, wherein advantageously rings are also encapsulated. In this way, the electromotive part of an elevator drive is easily exchangeable.

In FIG. 1, a stator 10 comprising three phases U, V and W with double-layer windings 11 (heavy lines) is shown. The problem in connection with double-layer winding 11 is that a separation into typically two winding-up steps is necessary due to the lower layer 12 and the upper layer 13.

First winding layer: lower layer 12 (bottom of groove 14)
Second winding layer: upper layer 13 (in direction of air gap 15)

It is to be noted that not only must the phases be connected to one another, but also the coils within the phases. The total number of connections in case of a 24-groove double-layer winding is 21 plus the star point. This leads to substantial expenditure of time. A manufacture at a sufficiently low price thus does not seem possible.

It is to be noted that said numbers are only valid for the shown embodiment. Also, other embodiments with different numbers of grooves 14 are possible.

It is now provided that the windings 11 are not wound up in two steps, but in three steps, i.e. each phase by itself. Thus, the winding is not segmented or separated into lower and upper layer, but into three phases U, V and W, in the figures the phase U being the first phase, phase V the second phase and phase W the third phase which is wound up.

Thus, the cumbersome and complex connecting of the coils and coil groups can be completely omitted. Only the star point must be connected. Thus, a reduction of 21 connections is achievable, whereby during manufacture the expenditure of time can be significantly reduced.

The figures show how the coils of the phases are wound up as alternating upper layers 13, lower layers 12, and transitions 17 therebetween. Herein, it is possible to wind up the phases one after the other. Also, it is to be noted that an insulation material 16 must be inserted between layers of different phases.

A winding of phase U is, for example, inserted in groove 24 and groove 1 in lower layer 12. Between groove 1 and groove 2 a transition 17 from lower layer 12 to upper layer 13 is performed. Regarding phase V, a transition 17 between lower layer 12 and upper layer 13 is performed for the winding from groove 2 to groove 3, and by the winding of groove 3 to groove 4. This specific type of winding up the coils of the individual phases makes possible a simple, automated winding-up of coils.

Also, it is to be noted that a flyer winding technique can be used.

Figure 2:
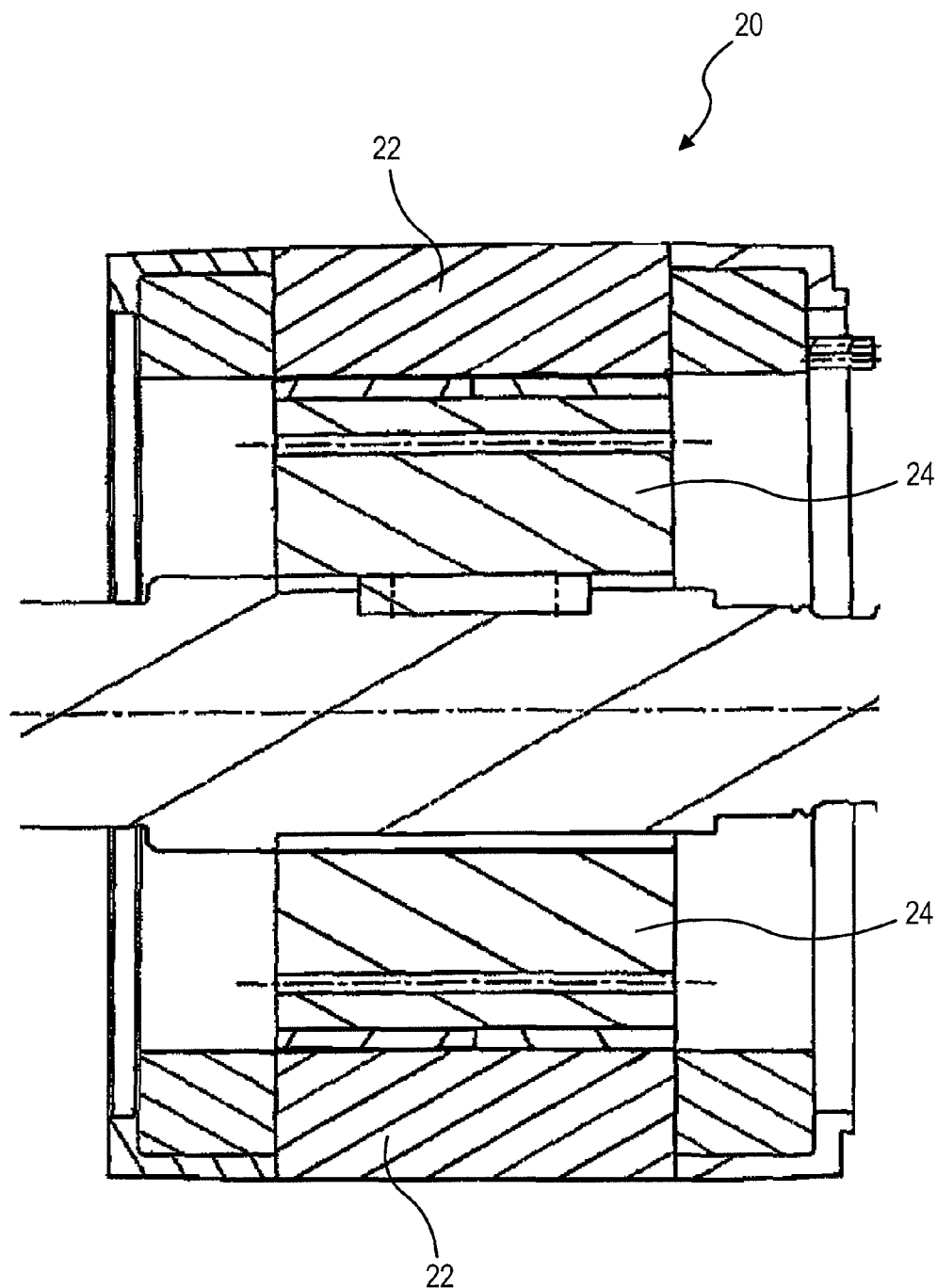
FIG. 2 shows a possible embodiment of an electromotive part according to the invention.

In FIG. 2 there is shown an embodiment of the electromotive part of an elevator drive, designated as a whole with reference numeral 20. This electromotive part 20 comprises a stator 22 and a rotor 24, and is provided as an internal rotor motor.

Also, a neutral interface is provided, so that the electromotive part 20 as shown can, in a simple manner, be inserted into or used for any drive. Herein, the dimensions of the electromotive part 20 can be small. This is especially achieved by means of the utilized single tooth winding. The two-layer winding provides an enhanced detent torque. Thus, the electromotive part as described is especially useable for applications in connection with an elevator drive.

It should thus be noted that the matter contained in the above description or shown in the accompanying drawings should be interpreted as illustrative and not in a limiting sense.

The invention claimed is:

1. Electromotive part of an elevator drive, which is provided as an internal rotor motor, comprising a rotor (24) and a stator (10, 22), wherein coils of the stator and/or the rotor (24) are provided as single tooth windings, and wherein the coils are, at least in part, encapsulated, and the coils are provided as two-layer windings, wherein the coils of individual phases (U, V, W) can be inserted as alternating upper layers and lower layers, wherein a first one of the phases comprises:
a first coil with a first side thereof in a lower layer of a first slot referred to as n in the following, and with a second side thereof in a lower layer of a slot n+1, and
a second coil with a first side thereof in a lower layer of a slot n+2 and a second side thereof in an upper layer of slot n+1;

a second one of the phases comprises:
a third coil with a first side thereof in a lower layer of a slot n+3 and a second side thereof in an upper layer of slot n+2; and
a fourth coil with a first side thereof in an upper layer of slot n+3 and a second side thereof in a lower layer of a slot n+4;

and a third one of the phases comprises:
a fifth coil with a first side thereof in an upper layer of slot n+4 and a second side thereof in a lower layer of a slot n+5; and
a sixth coil with a first side thereof in an upper layer of a slot n+6 and a second side thereof in an upper layer of slot n+5.

2. Electromotive part of an elevator drive according to claim 1, which is provided without a housing.

3. Electromotive part of an elevator drive according to claim 1, comprising a modular construction.

4. Method for winding-up coils of an electromotive part (20) of an elevator drive with two-layer windings, wherein the coils of individual phases (U, V, W) are inserted as alternating upper and lower layers, wherein
- a first one of the phases comprises:
  - a first coil with a first side thereof in a lower layer of a first slot referred to as n in the following, and with a second side thereof in a lower layer of a slot n+1, and
  - a second coil with a first side thereof in a lower layer of a slot n+2 and a second side thereof in an upper layer of slot n+1;
- a second one of the phases comprises:
  - a third coil with a first side thereof in a lower layer of a slot n+3 and a second side thereof in an upper layer of slot n+2; and
  - a fourth coil with a first side thereof in an upper layer of slot n+3 and a second side thereof in a lower layer of a slot n+4;
- and a third one of the phases comprises:
  - a fifth coil with a first side thereof in an upper layer of slot n+4 and a second side thereof in a lower layer of a slot n+5; and
  - a sixth coil with a first side thereof in an upper layer of a slot n+6 and a second side thereof in an upper layer of slot n+5.

\* \* \* \* \*